(12) United States Patent
Oskooei et al.

(10) Patent No.: US 6,871,488 B2
(45) Date of Patent: Mar. 29, 2005

(54) NATURAL GAS FUEL NOZZLE FOR GAS TURBINE ENGINE

(75) Inventors: Saeid Oskooei, Toronto (CA); Kian McCaldon, Orangeville (CA)

(73) Assignee: Pratt & Whitney Canada Corp., Quebec (CA)

( * ) Notice: Subject to any disclaimer, the term of this patent is extended or adjusted under 35 U.S.C. 154(b) by 91 days.

(21) Appl. No.: 10/320,410

(22) Filed: Dec. 17, 2002

(65) Prior Publication Data

US 2004/0112061 A1 Jun. 17, 2004

(51) Int. Cl.[7] .............................. F02C 3/22; F02C 7/22
(52) U.S. Cl. ................................. 60/39.465; 60/740
(58) Field of Search ........................ 60/39.463, 39.465, 60/740, 748

(56) References Cited

U.S. PATENT DOCUMENTS

| | | |
|---|---|---|
| 3,788,067 A | 1/1974 | Carlisle et al. |
| 4,726,192 A | 2/1988 | Willis et al. |
| 4,754,600 A | 7/1988 | Barbier et al. |
| 4,763,481 A | 8/1988 | Cannon |
| 4,833,878 A | 5/1989 | Sood et al. |
| 5,408,830 A | 4/1995 | Lovett |
| 5,431,019 A | 7/1995 | Myers et al. |
| 5,435,126 A * | 7/1995 | Beaudoin ................. 60/39.463 |
| 5,477,685 A | 12/1995 | Samuelson et al. |
| 5,579,645 A | 12/1996 | Prociw et al. |
| 6,155,056 A | 12/2000 | Sampath et al. |
| 6,289,677 B1 | 9/2001 | Prociw et al. |
| 6,460,326 B2 * | 10/2002 | Bechtel et al. ........... 60/39.465 |
| 2002/0162333 A1 | 11/2002 | Zelina |

FOREIGN PATENT DOCUMENTS

| | | |
|---|---|---|
| EP | 1 202 995 | 5/2002 |
| FR | 532086 | 10/1954 |

* cited by examiner

Primary Examiner—Louis J. Casaregola
(74) Attorney, Agent, or Firm—Ogilvy Renault

(57) ABSTRACT

A gas fuel nozzle for mounting in a combustor wall of a gas turbine engine, with an at least partially radially-directed array of gas fuel outlets extending beyond an air flow head having an array of compressed air jet apertures around the gas fuel outlets. The air flow head also has a deflector for creating an axial flow of air for deflecting in an axial direction the radially-injected gas fuel.

15 Claims, 4 Drawing Sheets

NATURAL GAS FUEL NOZZLE FOR GAS TURBINE ENGINE

TECHNICAL FIELD

The invention relates to a natural gas fuel nozzle for a gas turbine engine and, more particularly, a nozzle adapted to permit conversion from a liquid fuel nozzle configuration to a natural gas configuration on an aero derivative gas turbine engine with minimal change to the design of other components.

BACKGROUND OF THE ART

The technical field to which the invention relates is a gas turbine engine combustor with the flexibility of using liquid fuel or natural gas fuel nozzles interchangeably. Many combustors for industrial engines in the prior art include dual fuel nozzles that are mounted in combustor walls and can receive both liquid fuel and natural gas fuel at the same time for mixing with compressed air.

The invention however is most advantageously applied to an aero derivative industrial gas turbine engine. Such engines are used for stationary industrial applications but incorporate the standard components from aircraft gas turbine engine designs for efficiency and economy in manufacturing and maintenance. An important feature of an aero derivative industrial gas turbine engine is the flexibility of utilizing liquid fuel or natural gas fuel as desired. An important advantage as well is that fuel nozzles operating on natural gas can be fitted into the same combustor interface as a liquid fuel nozzle. However, liquid fuel nozzles, and especially swirl-type nozzles, are not suitable for use with natural gas because natural gas molecules are much smaller than particles of sprayed liquid fuel aerosol. As a result, gas molecules would be trapped in the swirl envelope created by a conventional liquid fuel nozzle. Also, the heat distribution around the nozzle may be different than for a liquid fuel, resulting in hot spots on the combustor. The difficulty is, however, that if a typical natural gas fuel nozzle is used, the combustor would require redesign of the combustor and other components relative to the engine's aero-engine equivalent.

In the prior art, a conventional dual fuel nozzle is often used so that operators can select between natural gas fuel and liquid fuel without changing nozzles. However, such nozzles are relative complex requiring multiple bores, multiple manifolds and complex fuel and air mixing jets. Since nozzles are often replaced and coke build-up requires frequent maintenance, there are advantages to use of simple interchangeable nozzles that can be manufactured at minimal cost. There is a need, however, for a simple gas fuel nozzle which may be used in an aero derivative engine with minimal change to other components of the engine. There is also a need for a gas fuel nozzle which is capable of delivering a fuel/air mixture which is as similar as possible to the liquid fuel nozzle for which the aero version of the gas turbine engine was originally designed.

It is an object of the invention to permit simple conversion of existing liquid fuel nozzles to natural gas fuel nozzles with minimal nozzle, combustor or other design changes.

Further objects of the invention will be apparent from review of the disclosure, drawings, and description of the invention below.

DISCLOSURE OF THE INVENTION

The invention, in one aspect, provides a gas fuel nozzle for mounting in a combustor end wall of a gas turbine engine, with a gas fuel delivery member having a gas fuel supply duct with a laterally directed array of gas fuel outlets extending beyond an air flow head about the gas fuel delivery member with a circumferential array of compressed air jet apertures. The fuel outlets are oriented to eject gas fuel with a radial component from the gas fuel delivery member and the air flow head has a deflector opening for creating an axial flow of air for deflecting the gas fuel ejected from the gas fuel delivery member in an axial direction.

In another aspect, the invention provides a method of delivering gas fuel to a gas turbine engine combustor, which involves injecting the gas fuel into the combustor with a radial component relative to an axial axis of the combustor and directing pressurized air at the injected gas fuel to deflect the injected gas fuel along the axis of the combustor.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
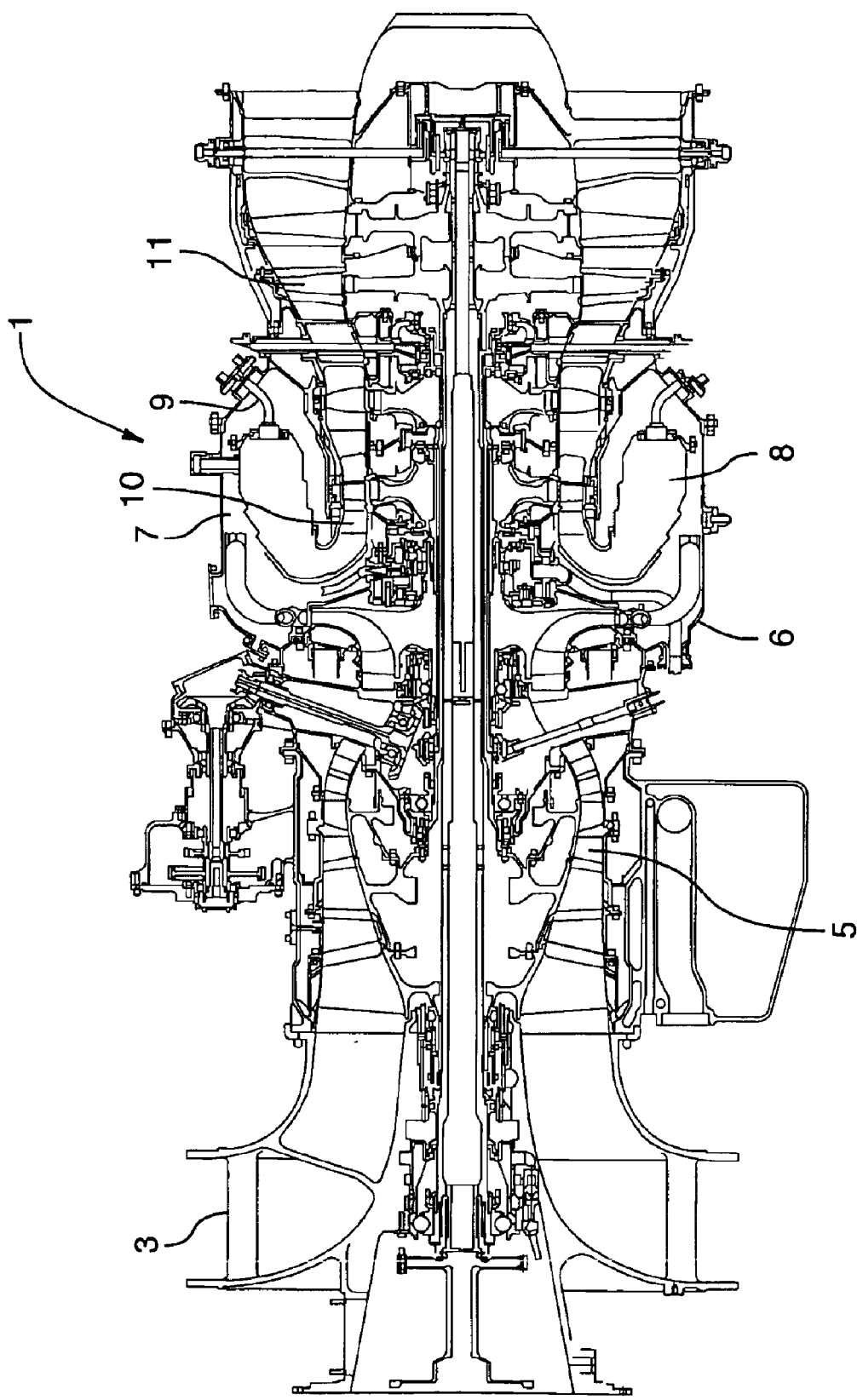
FIG. 1 is an axial cross-sectional view through a typical industrial gas turbine engine, showing the general arrangement of its component parts.

FIG. 1 shows an axial cross-section through a typical industrial gas turbine (IGT) engine. It will be understood that the invention may be applicable to almost any type of IGT engine with a combustor and fuel nozzles. Air intake into the engine 1 passes in an inlet 3 into a compressor portion 5, through a diffuser 6 and then into a plenum 7 that surrounds a combustor 8. Fuel is supplied to the combustor 8 through fuel nozzles 9, which also mixes fuel with air from the plenum 7 as it is injected into the combustor 8 as a fuel air mixture that is then ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the engine 1 as exhaust.

Figure 2:
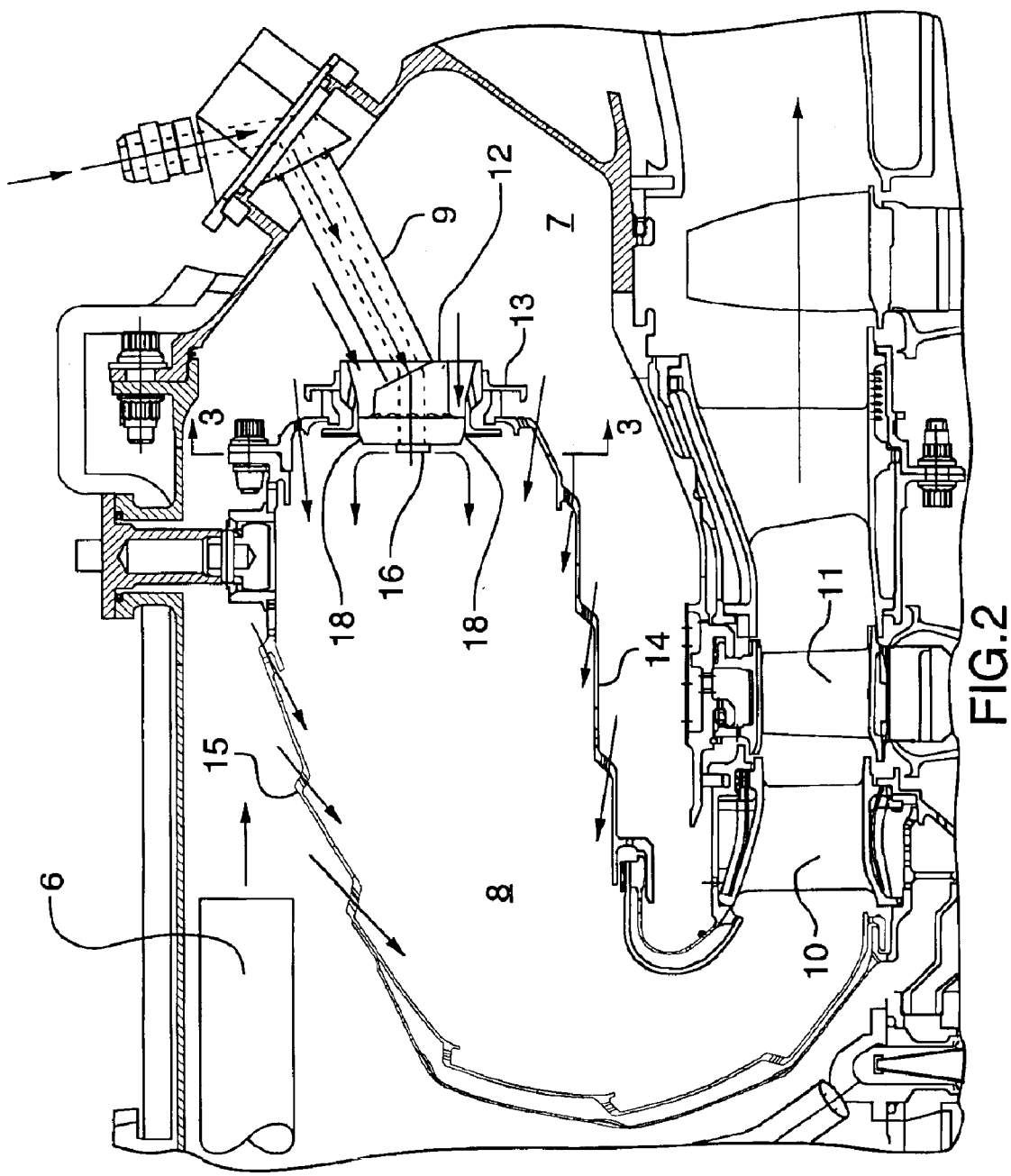
FIG. 2 is an enlarged axial sectional view through the combustor section of FIG. 1 incorporating fuel nozzles according to the present invention.

FIG. 2 shows an enlarged view of the reverse flow combustor 8 (though, of course the invention is not limited to this configuration). Of particular advantage, the invention provides a gas fuel nozzle 12 that is configured to be mounted in the combustor end wall 13 without requiring modification of the other components (i.e. combustor, engine casing etc.) which are used with the aero version of the engine. For example, where an aero derivative industrial gas turbine engine is to be fueled with natural gas, improved efficiency in manufacture and maintenance results. Using the natural gas fuel nozzle 12 of the invention, it is not necessary to manufacture or design a combustor 8 that is specifically adapted for natural gas fuel or for stationary operation in an industrial setting, in light of the differences between the behaviour of liquid and natural gas fuels in swirl nozzles, described above. The combustor end wall 13 including nozzle mounting mechanism such as floating collars and combustor liners need not be modified from conventional aircraft combustor design. As a result, the aero derivative industrial engine requires only the minor modification of changing fuel nozzles from an aircraft engine when the present invention is employed. The combustor 8 with end wall 13 and inner wall 14 and outer wall 15 can remain identical and capitalize on existing manufacturing and maintenance facilities using aero derivative components.

Figure 3:
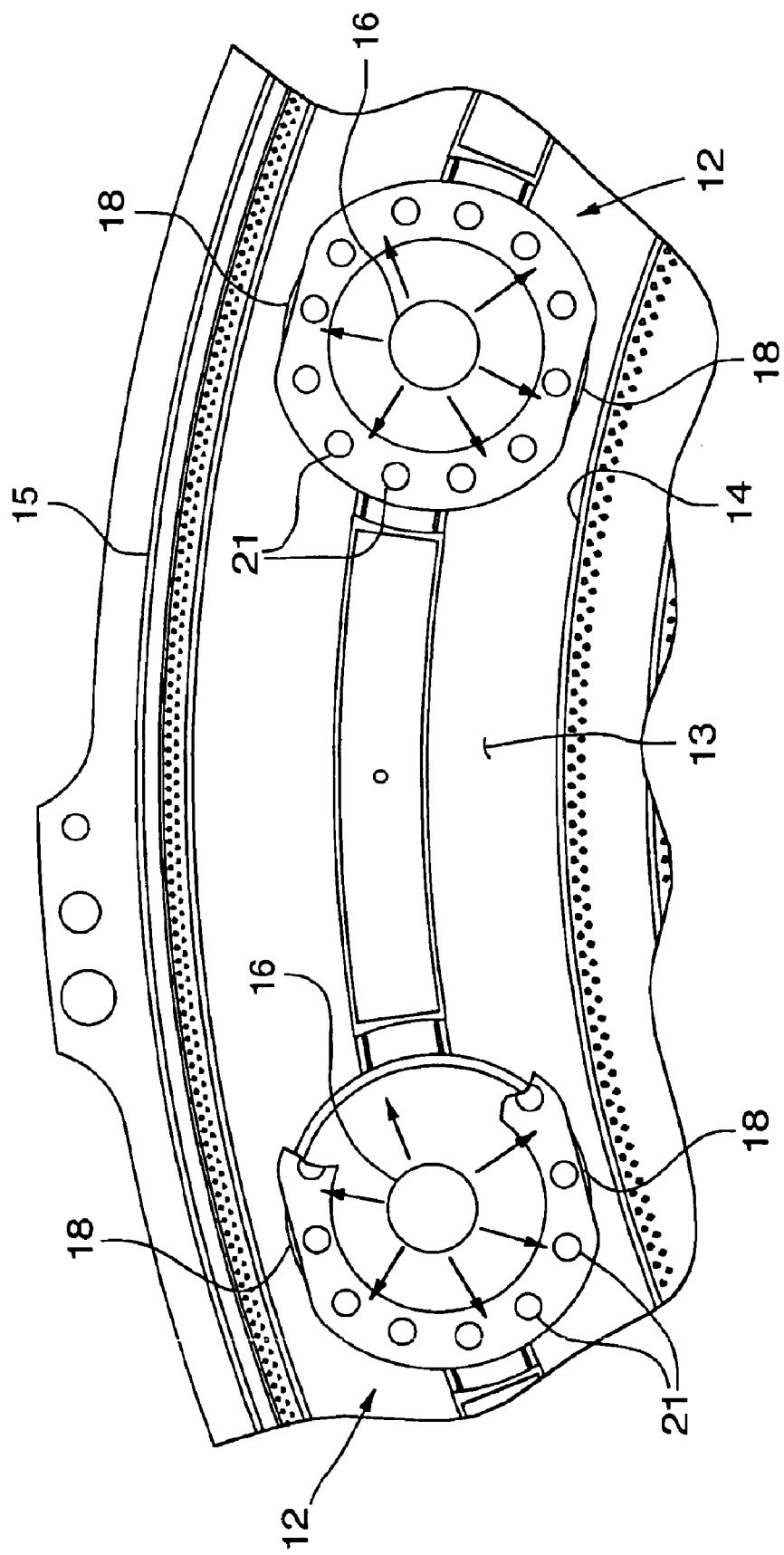
FIG. 3 is a radial detail view along line 3—3 of FIG. 2.

In FIGS. 2 and 3, the gas fuel nozzle 12 according to the invention is mounted in the end wall 13 of the combustor 8 in a configuration similar to aircraft gas turbine engines having a combustor 8 with a series of nozzles 12 mounted in the end wall 13 in a spaced apart circumferential array. The nozzle 12 is fed with natural gas fuel in this embodiment via the fuel tube 9 (though any suitable method of providing fuel may be employed) and then the fuel is ejected from a central gas fuel delivery member 16 radially as indicated with arrows in FIGS. 2 and 3. Air from the plenum 7 passes through inner and outer walls 14 and 15 of the combustor as well as through the nozzle 12 to axially deflect and mix with the gas fuel as indicated with arrows in FIG. 2 for example.

Figure 4:
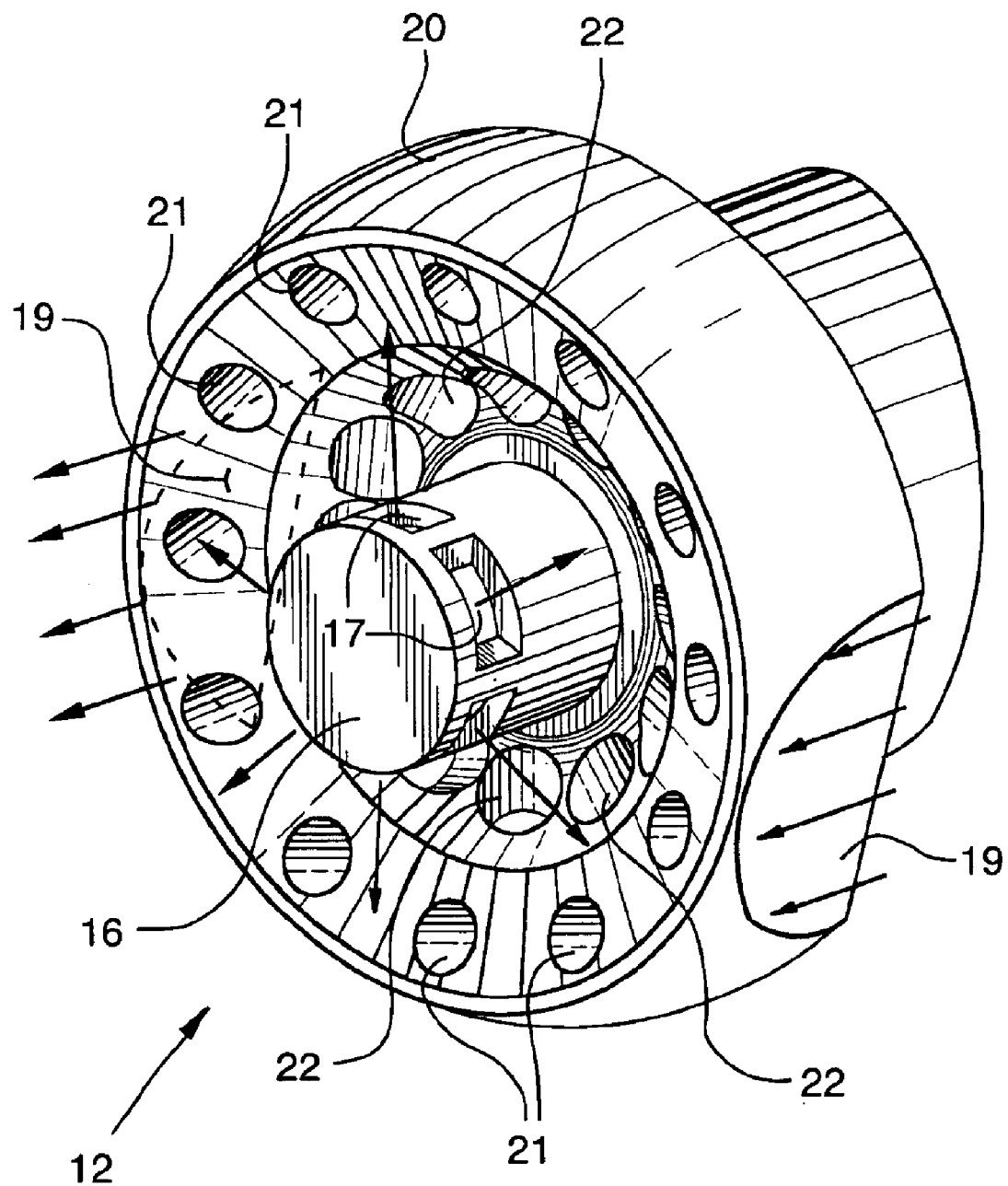
FIG. 4 is a perspective view of a single natural gas fuel nozzle with a central upstanding gas fuel delivery member having rectangular gas outlet ports ejecting gas radially and two planar surfaces on the outer edges of the airflow head creating a deflecting curtain of compressed air to protect the adjacent combustor walls.

FIG. 4 shows details of the nozzle 12. The gas fuel delivery member 16 has a plurality of rectangular gas fuel outlets 17. In the embodiment shown the gas fuel delivery member 16 has a sidewall with radially open ports 17 and the downstream end of the gas fuel delivery member 16 is capped. However in order to direct gas fuel having a radial component as illustrated, those skilled in the art will appreciate that there are other means by which this function can be accomplished. For example, with a plurality of circular holes in the side wall and auxiliary holes in the end cap of the gas fuel delivery members 16, or with a conical deflector. In all cases however, the fuel outlets 17 are oriented to eject gas fuel with a radial component from the gas fuel delivery member 16. To overcome the difficulty of gas molecules becoming trapped in the swirl envelope due to their small size (described above), the natural gas fuel is ejected radially from the gas fuel delivery member 16 with a sufficiently high velocity to create the required circulation within the combustor.

As seen in FIGS. 2 and 3, the combustor walls 14 and 15 are relatively close to the nozzle 12. Therefore, by ejecting gas fuel radially as described, the combustor walls 14 and 15 and any liners or other structures on the walls 14 and 15 would be excessively subjected to hot gases moving radially, detrimentally causing hot spots. Therefore, in order to counteract these radial flows towards the combustor wall 14 and 15, a deflecting curtain of air is provided through deflector apertures 28 created by the planar surface 19 disposed on the radially outer edge of the air flow head 20. The nozzle 12 is oriented so that a deflector aperture 18 is positioned adjacent the outer combustor wall 15 and a second deflector aperture 18 is positioned adjacent the inner combustor wall 14. The air that progresses from the plenum 7 into the combustor 8 through the apertures 18 provides a deflecting air curtain for protecting the combustor walls 14 and 15 and helps in recirculation of the fuel and air as well as keeping the flame on.

As indicated in FIGS. 4 and 3, in order to provide sufficient air fuel mixture and circulation of air within the combustor 8, the airflow head 20 which surrounds the gas fuel delivery members 16 includes axially directed bores 21 and radially directed bores 22 which open to impinge on an upstream portion of the gas fuel delivery member 16. The radially directed bores 22 are positioned within a countersunk conical recess, which surrounds the gas fuel delivery member 16 and creates airflow axially along the side wall of the gas fuel delivery member 16.

The outer ring of axially directed bores 21 further serves to create an axial flow deflecting the radial flow of gas through gas fuel outlets 17 (preferably rectangular, though other shapes may be used) to create appropriate air fuel mixture, aid in circulation within the combustor 8 and direct the gas fuel mixture into the central portion of the combustor for ignition.

However, to further deflect the radial flow of gas fuel exiting through gas fuel outlets 17, the airflow head 20 also includes planar surfaces 19, that create deflector apertures 18 for deflecting the gas fuel ejected from the gas fuel delivery member 16 towards an axial direction with resulting flow of compressed air entering the combustor 8 from the plenum 7. One skilled in the art will recognize that the deflector apparatus of the present invention can be modified as required to correct the hot spots and other design problems that may occur in a particular combustor configuration.

As a result, the nozzle 12 has a relatively simple construction compared to conventional liquid fuel nozzles, or dual fuel nozzles. In addition, the combustor walls 14, 15, and 13 and other components from an aero derivative gas turbine engine may be utilized without modification. Converting an engine model from liquid fuel nozzles to gas fuel nozzles 12 for use as an aero derivative IGT does not therefore represent a substantial additional burden on the manufacturer, and thus permits efficiencies in manufacture and maintenance of such products. The present invention also advantageously capable of delivering a fuel/air mixture which is similar to that delivered by the liquid fuel nozzle for which the aero version of the gas turbine engine was originally designed.

Although the above description relates to a specific preferred embodiment as presently contemplated by the inventor, it will be understood that the invention in its broad aspect includes mechanical and functional equivalents of the elements described herein.

We claim:

1. A gas fuel nozzle for mounting in a combustor end wall of a gas turbine engine, the engine having a combustor defined with inner and outer walls extending from the combustor end wall, the gas fuel nozzle comprising:

a gas fuel delivery member having a gas fuel supply duct with a plurality of gas fuel outlets;

an air flow head about the gas fuel delivery member with a plurality of compressed air jet apertures; wherein:

the fuel outlets are oriented to eject gas fuel with a radial component from the gas fuel delivery member; and at least one deflector aperture disposed on the air flow head adjacent at least one of the inner combustor wall and the outer combustor wall for deflecting the gas fuel ejected from the gas fuel delivery member in an axial direction with a flow of compressed air.

2. A gas fuel nozzle according to claim 1 wherein the deflector aperture comprises a planar surface.

3. A gas fuel nozzle according to claim 2 wherein the planar surface is disposed on a radially outer edge of the air flow head.

4. A gas fuel nozzle according to claim 1 wherein the compressed air jet apertures comprise axially directed bores.

5. A gas fuel nozzle according to claim 1 wherein the compressed air jet apertures comprise radially directed bores open to an upstream portion of the gas fuel delivery member.

6. A gas fuel nozzle according to claim 1 wherein the gas fuel delivery member has a side wall with radially open ports.

7. A gas fuel nozzle according to claim 6 wherein the ports are rectangular.

8. A gas fuel nozzle according to claim 1 wherein the downstream end of the gas fuel delivery member is capped.

9. An air blast gas fuel nozzle for a gas turbine engine having a combustor, the gas fuel nozzle comprising:

a nozzle head adapted for mounting in a wall of the combustor and protruding therethrough, the nozzle head having a plurality of air flow apertures there through in communication with a source of pressurized air; and a gas fuel delivery member disposed on the head centrally of said plurality of air flow apertures and adapted to extend into the combustor, the delivery member having a gas fuel inlet supply duct communicating with a plurality of gas fuel outlets, the gas fuel outlets oriented to eject gas fuel in the combustor with a radial component relative to the head;

wherein the head further comprises at least one deflector aperture disposed in the head, the aperture in communication with a source of pressurized air, the deflector aperture positioned on the head so that an air flow therethrough intersects a gas fuel stream ejected with a radial component from the delivery member.

10. The air blast gas fuel nozzle of claim 9 wherein the at least a portion of the air flow apertures in the nozzle head are positioned in the nozzle to deliver a pressurized air flow therethrough which intersects and deflects a gas fuel stream ejected with a radial component from the delivery member.

11. The air blast gas fuel nozzle of claim 9 gas fuel stream ejected from the delivery member is directed only in the radial direction relative to the nozzle head.

12. An air blast gas fuel nozzle for a gas turbine engine having a combustor, the gas fuel nozzle comprising:

a nozzle head adapted for mounting in a wall of the combustor and protruding therethrough, the nozzle head having a plurality of air flow apertures there through in communication with a source of pressurized air; and a gas fuel delivery member disposed on the head centrally of said plurality of air flow apertures and adapted to extend into the combustor, the delivery member having a gas fuel inlet supply duct communicating with a plurality of gas fuel outlets, the gas fuel outlets oriented to eject gas fuel in the combustor with a radial component relative to the head, wherein at least a portion of the air flow apertures are directed radially towards an upstream portion of the fuel delivery member.

13. The air blast gas fuel nozzle of claim 12 wherein the at least a portion of the air flow apertures in the nozzle head are positioned in the nozzle to deliver a pressurized air flow therethrough which intersects and deflects a gas fuel stream ejected with a radial component from the delivery member.

14. The air blast gas fuel nozzle of claim 12 wherein the head further comprises at least one deflector aperture disposed in the head, the aperture in communication with a source of pressurized air, the deflector aperture positioned on the head so that an air flow therethrough intersects a gas fuel stream ejected with a radial component from the delivery member.

15. The air blast gas fuel nozzle of claim 12 gas fuel stream ejected from the delivery member is directed only in the radial direction relative to the nozzle head.

* * * * *